(12) United States Patent
Hida et al.

(10) Patent No.: US 10,514,307 B2
(45) Date of Patent: Dec. 24, 2019

(54) FAULT DETECTION APPARATUS

(71) Applicant: Hitachi Automotive Systems, Ltd., Hitachinaka-shi, Ibaraki (JP)

(72) Inventors: Shinichirou Hida, Hitachinaka (JP); Satoru Shigeta, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 247 days.

(21) Appl. No.: 15/540,432

(22) PCT Filed: Dec. 16, 2015

(86) PCT No.: PCT/JP2015/085133
§ 371 (c)(1),
(2) Date: Jun. 28, 2017

(87) PCT Pub. No.: WO2016/111128
PCT Pub. Date: Jul. 14, 2016

(65) Prior Publication Data
US 2017/0363481 A1 Dec. 21, 2017

(30) Foreign Application Priority Data
Jan. 6, 2015 (JP) ................................. 2015-000929

(51) Int. Cl.
*G01K 7/24* (2006.01)
*G01K 15/00* (2006.01)
(Continued)

(52) U.S. Cl.
CPC ............. *G01K 7/245* (2013.01); *G01K 1/028* (2013.01); *G01K 3/005* (2013.01); *G01K 7/24* (2013.01);
(Continued)

(58) Field of Classification Search
CPC .... G01R 27/02; G01R 31/00; G01R 31/2874; B60R 2021/01184; G06F 11/00;
(Continued)

(56) References Cited

U.S. PATENT DOCUMENTS 4,210,024 A * 7/1980 Ishiwatari ............ G01D 3/0365
374/1
4,838,707 A * 6/1989 Ozawa .................... G01K 1/028
374/170
(Continued)

FOREIGN PATENT DOCUMENTS

JP 2005-9924 A 1/2005
JP 2005-345380 A 12/2005
(Continued)

OTHER PUBLICATIONS

International Search Report (PCT/ISA/210) issued in PCT Application No. PCT/JP2015/085133 dated Feb. 23, 2016 with English-language translation (four (4) pages).
(Continued)

*Primary Examiner* — Lisa M Caputo
*Assistant Examiner* — Philip L Cotey
(74) *Attorney, Agent, or Firm* — Crowell & Moring LLP

(57) ABSTRACT

An object of the present invention is to enhance fault detection accuracy offered by a fault detection apparatus. A microcomputer reads a characteristic signal input thereto. The microcomputer compares a characteristic read from the characteristic signal with a previously established reference value. The previously established reference value represents a characteristic exhibited by a resistor that is connected with a temperature sensor circuit when the temperature sensor circuit operates normally. The microcomputer determines whether the characteristic exhibited by the resistor falls within a detection range. If it is determined that the char-
(Continued)

acteristic falls with the detection range, the temperature sensor circuit is detected to be operational and information indicating that the temperature sensor circuit is operational is output to a host control apparatus. If it is determined that the detection range is exceeded, the temperature sensor circuit is detected to be faulty and information indicating that the temperature sensor circuit is faulty is output to the host control apparatus.

5 Claims, 3 Drawing Sheets

(51) Int. Cl.
 *G01K 1/02* (2006.01)
 *G01K 3/00* (2006.01)
 *G01K 7/18* (2006.01)
(52) U.S. Cl.
 CPC ........... *G01K 15/00* (2013.01); *G01K 15/007* (2013.01); *G01K 7/183* (2013.01)
(58) Field of Classification Search
 CPC .... G06F 11/3058; G01K 7/245; G01K 1/028; G01K 3/005; G01K 7/24; G01K 15/00; G01K 15/007; G01K 7/183
 See application file for complete search history.

(56) References Cited

U.S. PATENT DOCUMENTS

| | | | | |
|---|---|---|---|---|
| 6,140,806 | A * | 10/2000 | Gohara | G05F 3/242 323/282 |
| 6,448,671 | B1 * | 9/2002 | Wallace | B60R 21/01 307/10.1 |
| 6,759,964 | B2 * | 7/2004 | Sato | H02M 7/00 340/590 |
| 7,411,514 | B2 * | 8/2008 | Enomoto | G01R 31/2829 324/647 |
| 2003/0076233 | A1 * | 4/2003 | Sato | H02M 7/00 340/679 |
| 2007/0036197 | A1 * | 2/2007 | Huttenlocher | G01K 7/42 374/1 |
| 2012/0112785 | A1 * | 5/2012 | Mizoguchi | G01R 19/16542 324/762.08 |
| 2013/0208758 | A1 * | 8/2013 | Towner | A62C 37/50 374/1 |
| 2014/0023110 | A1 * | 1/2014 | Hamanaka | G01K 13/00 374/142 |
| 2016/0315584 | A1 * | 10/2016 | Kouno | G01R 27/02 |

FOREIGN PATENT DOCUMENTS

| | | |
|---|---|---|
| JP | 2006-200914 A | 8/2006 |
| JP | 2009-236536 A | 10/2009 |
| JP | 2013-130545 A | 7/2013 |

OTHER PUBLICATIONS

Japanese-language Written Opinion (PCT/ISA/237) issued in PCT Application No. PCT/JP2015/085133 dated Feb. 23, 2016 (three (3) pages).

\* cited by examiner

US 10,514,307 B2

FAULT DETECTION APPARATUS

TECHNICAL FIELD

The present invention relates to a fault detection apparatus for a sensor circuit.

BACKGROUND ART

A power conversion apparatus such as an inverter mounted on, for example, a vehicle includes a sensor for measuring a physical quantity of, for example, temperature or voltage and a sensor circuit for adjusting a sensor output to a required measurement range and protection control for the power conversion apparatus is performed on the basis of the output from the sensor circuit. Thus, a faulty output characteristic of the sensor circuit disables proper protection control for the power conversion apparatus.

A known approach toward fault detection of the sensor circuit is to connect a temperature sensor with a ground via a resistance element and a temperature sensor circuit is diagnosed for a fault on the basis of the output from the temperature sensor circuit (PTL 1).

CITATION LIST

Patent Literature

PTL 1: JP 2005-9924 A

SUMMARY OF INVENTION

Technical Problem

According to the technique disclosed in PTL 1, a change in temperature during a fault diagnostics procedure causes the output from the temperature sensor circuit to vary. A threshold used for determining a fault thus needs to be set in consideration of such output variations caused by the change in temperature. The known technique unfortunately offers low fault detection accuracy.

Solution to Problem

A fault detection apparatus according to claim 1, includes: a sensor circuit part connected with a sensor part, the sensor circuit part generating a characteristic signal of the sensor part; a signal output part that outputs a predetermined signal value; a changeover circuit part that connects the signal output part in place of the sensor part with the sensor circuit part; and a control part that detects a fault in the sensor circuit part using a diagnostics signal that is output from the sensor circuit part on a basis of the predetermined signal value when the signal output part is connected.

Advantageous Effects of Invention

The aspect of the present invention can enhance fault detection accuracy of the sensor circuit.

DESCRIPTION OF EMBODIMENTS

Figure 1:
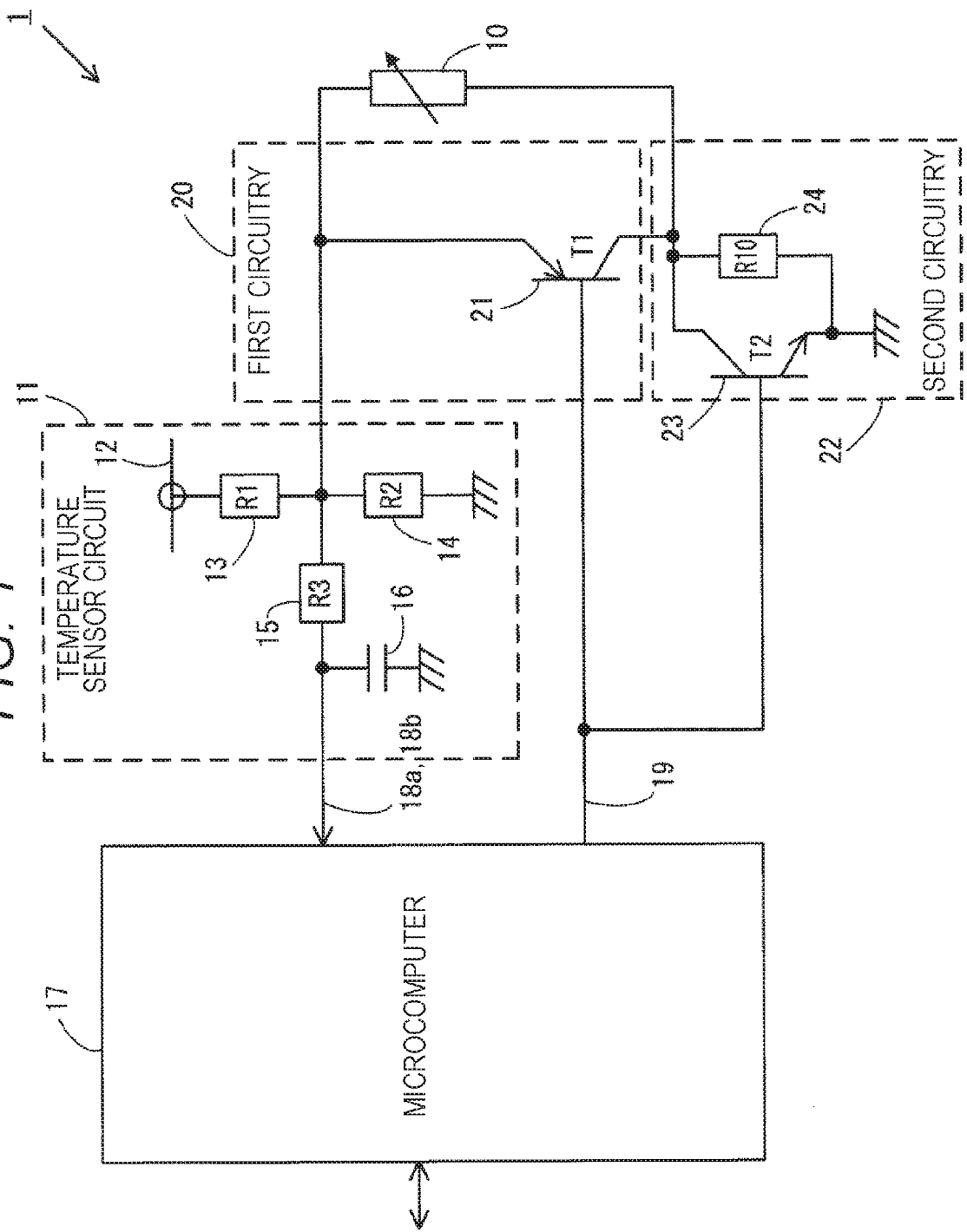
FIG. 1 is a diagram illustrating a circuit configuration of a fault detection apparatus.

A fault detection apparatus according to one embodiment of the present invention is hereinafter described with reference to the accompanying drawings. FIG. 1 illustrates a circuit configuration of a fault detection apparatus 1.

A temperature sensor 10 is disposed in a power conversion apparatus (not shown) such as an inverter. The temperature sensor 10 has a resistance value that varies corresponding to a temperature coefficient of resistance dependent on a temperature change. The temperature sensor 10 is connected with a temperature sensor circuit 11. The temperature sensor circuit 11 includes a power source 12, resistors 13, 14, and 15, and a capacitor 16.

The power source 12 passes a current to the temperature sensor 10 via the resistor 13. The resistor 13 and the resistor 14 are connected in series with each other. The resistor 14 has a first end connected with the temperature sensor 10 and a second end connected to ground. The resistor 14 is disposed in parallel with the temperature sensor 10 to thereby constitute combined resistance.

The resistor 15 has a first end connected with the first end of the resistor 14 and a second end grounded via the capacitor 16. The resistor 15 has the second end connected with a microcomputer 17 and outputs a characteristic signal 18a to the microcomputer 17. The characteristic signal 18a is generated through a combination of the power source 12, the resistor 13, the resistor 14, and the temperature sensor 10. The resistor 15 limits a current to the microcomputer 17 and achieves a filtering effect. The capacitor 16 achieves a filtering effect.

The microcomputer 17 converts the characteristic signal 18a that has been input as an analog signal to a corresponding digital signal before performing a fault diagnostics process to be described later. The microcomputer 17 notifies a host control apparatus (not shown) of a result of the fault diagnostics process. Additionally, the microcomputer 17 outputs a changeover signal 19 in the fault diagnostics process.

The changeover signal 19 is input to a switch circuit 21 of a first circuitry 20. The first circuitry 20 is connected in parallel with the temperature sensor 10. When the changeover signal 19 is ON (Low), the switch circuit 21 is brought into a conductive state and the temperature sensor 10 is disabled. When the changeover signal 19 is OFF (High), the switch circuit 21 is brought into a disconnected state and the temperature sensor 10 is enabled.

The changeover signal 19 is also input to a switch circuit 23 of a second circuitry 22. In the second circuitry 22, the switch circuit 23 is connected in parallel with a resistor 24 and disposed between the temperature sensor 10 and GND. The resistor 24 has a predetermined resistance value. The resistor 24, when connected with the power source 12 via the resistor 13, outputs a predetermined voltage corresponding to the resistance value to the temperature sensor circuit 11. When the changeover signal 19 is ON (Low), the switch circuit 23 is brought into a disconnected state and the resistor 24 is connected with the temperature sensor circuit 11. When the changeover signal 19 is OFF (High), the switch circuit 23 is brought into a conductive state and the resistor 24 is disabled.

Specifically, the changeover signal 19 is normally OFF (High) and, at this time, the switch circuit 21 of the first circuitry 20 is disconnected and the temperature sensor 10 is enabled. The switch circuit 23 of the second circuitry 22 becomes conductive at the same time. Thus, the temperature sensor 10 is connected with the temperature sensor circuit 11, so that the characteristic signal 18*a* by the temperature sensor 10 is input to the microcomputer 17 and the microcomputer 17 performs temperature measurement.

During a fault diagnostics procedure, when the changeover signal 19 turns ON (Low), the switch circuit 21 becomes conductive and the temperature sensor 10 is disabled. The switch circuit 23 is disconnected simultaneously. Thus, the resistor 24 is connected with the temperature sensor circuit 11 and a diagnostics signal 18*b* based on a voltage output from the resistor 24 is output from the temperature sensor circuit 11 to the microcomputer 17. The microcomputer 17 detects the diagnostics signal 18*b* output from the temperature sensor circuit 11 and, on the basis of the detection result, performs the fault diagnostics procedure for the temperature sensor circuit 11. Use of the resistor 24 having a constant resistance value and offering high accuracy at this time can achieve enhanced detection accuracy of the diagnosis.

Figure 2:
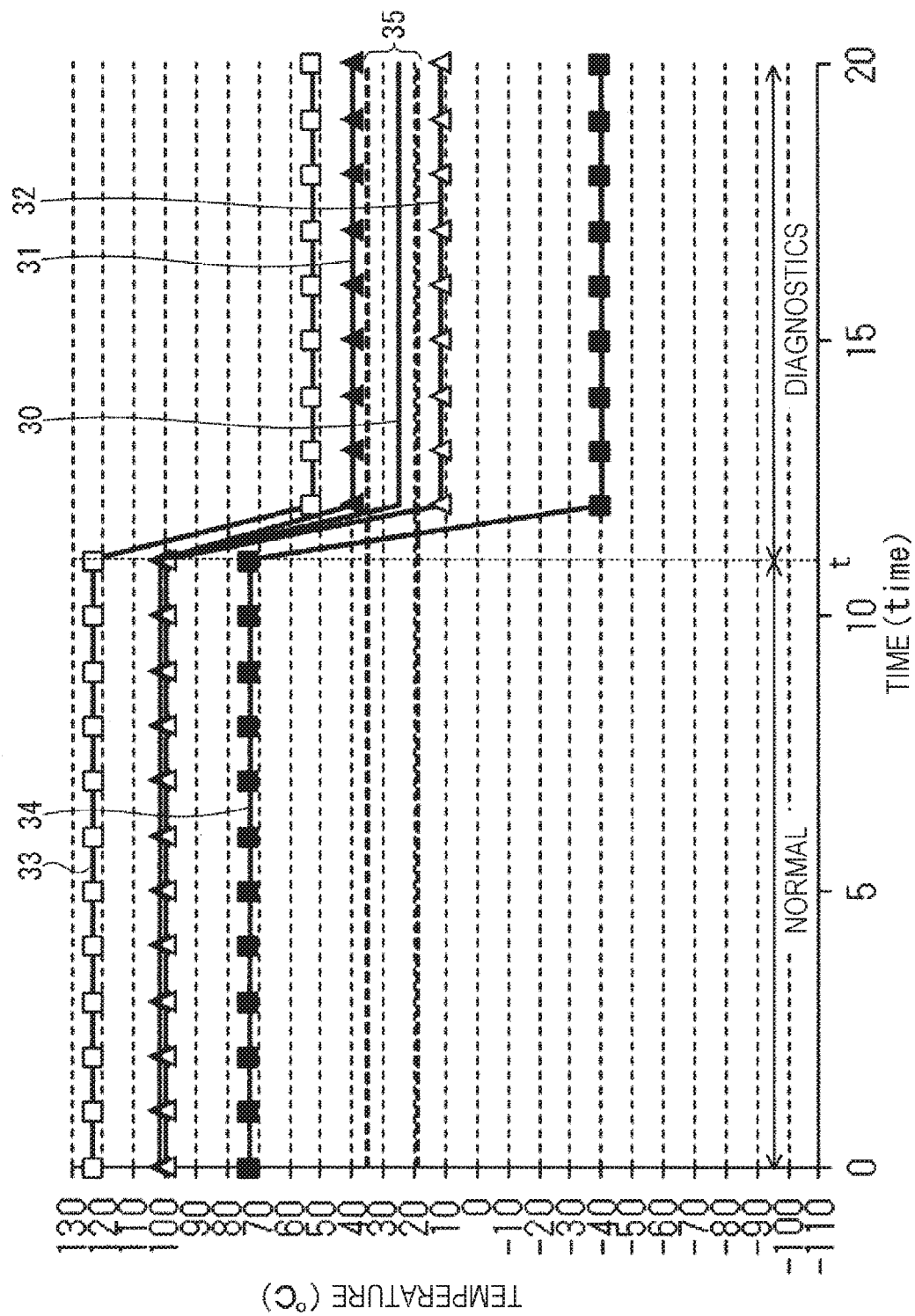
FIG. 2 is a graph depicting characteristics under normal and detection conditions.

FIG. 2 is a graph depicting output characteristics of the temperature sensor circuit 11 under normal conditions and during a fault diagnostics procedure. The ordinate of FIG. 2 denotes temperatures that represent values of the characteristic signal 18*a* and the diagnostics signal 18*b* output from the temperature sensor circuit 11. The ordinate of FIG. 2 denotes measurement time. Under normal conditions from the start of measurement up to measurement time t, the characteristic signal 18*a* by the temperature sensor 10 is input to the microcomputer 17 for measurement of temperatures. During the fault diagnostics procedure that starts with the measurement time t, the diagnostics signal 18*b* by the resistor 24 is input to the microcomputer 17 and temperatures are measured to correspond to the values of the diagnostics signal 18*b*. An output characteristic 30 represents an output characteristic of the temperature sensor circuit 11 when the temperature sensor circuit 11 is not faulty. An output characteristic 31 represents an output characteristic of the temperature sensor circuit 11 when a fault occurs in the resistor 14 and the resistance value of the resistor 14 is reduced to ½, for example. An output characteristic 32 represents an output characteristic of the temperature sensor circuit 11 when the resistance value of the resistor 14 is twice as large. An output characteristic 33 represents an output characteristic of the temperature sensor circuit 11 when the resistance value the resistor 13 is twice as large. An output characteristic 34 represents an output characteristic of the temperature sensor circuit 11 when the resistance value of the resistor 13 is reduced to ½. As shown in FIG. 2, the output characteristics 31 to 34 vary widely from each other during the fault diagnostics procedure as compared with the output characteristic 30 involving no fault. Thus, the temperature sensor circuit 11 is diagnosed as follows. Specifically, the diagnostics signal 18*b* during the fault diagnostics procedure is detected; when the detected value falls within a predetermined detection range 35 established with reference to the output characteristic 30, the temperature sensor circuit 11 is diagnosed to be operational; and when the detected value exceeds the detection range 35, the temperature sensor circuit 11 is diagnosed to be faulty.

Figure 3:
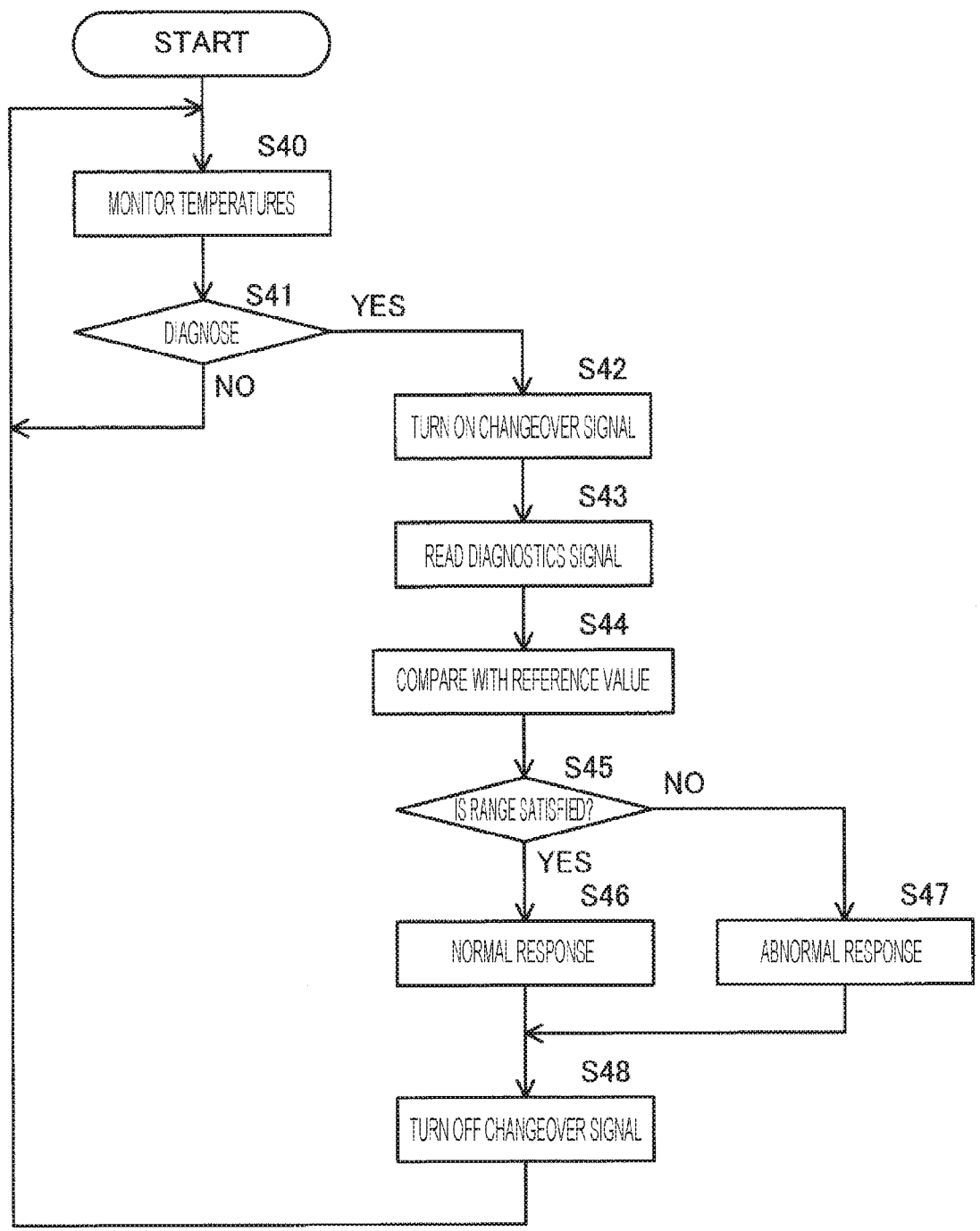
FIG. 3 is a flowchart illustrating a fault detection process.

FIG. 3 is a flowchart illustrating a fault detection process performed by the microcomputer 17.

At Step S40, the microcomputer 17 monitors temperatures of the temperature sensor 10. It is noted that the changeover signal 19 is OFF under the normal condition in which the temperatures of the temperature sensor 10 are monitored. Specifically, the temperature sensor 10 is connected with the temperature sensor circuit 11 and the characteristic signal 18*a* by the temperature sensor 10 is input to the microcomputer 17, so that the microcomputer 17 monitors the temperatures.

At Step S41, the microcomputer 17 determines whether the fault diagnostics procedure for the temperature sensor circuit 11 is to be performed. For example, if an instruction to perform the fault diagnostics procedure is received from the host control apparatus, the microcomputer 17 determines to perform the fault diagnostics procedure. If the instruction to perform the fault diagnostics procedure is not received from the host control apparatus, the microcomputer 17 determines not to perform the fault diagnostics procedure. If it is determined not to perform the fault diagnostics procedure, the microcomputer 17 returns to Step S40 and continues monitoring the temperatures. It is noted that, when a faulty temperature is detected during the monitoring, the microcomputer 17 notifies the host control apparatus of the fault in temperature.

If it is determined at Step S41 to perform the fault diagnostics procedure, the microcomputer 17 performs Step S42. At Step S42, the microcomputer 17 turns ON the changeover signal 19. When the changeover signal 19 is turned ON, the resistor 24, instead of the temperature sensor 10, is connected with the temperature sensor circuit 11 and the diagnostics signal 18*b* by the resistor 24 is input to the microcomputer 17.

At Step S43, the microcomputer 17 reads the diagnostics signal 18*b* input thereto. At Step S44, the microcomputer 17 compares a read value of the diagnostics signal 18*b* with a previously established reference value. The previously established reference value represents a value of the diagnostics signal 18*b* that is output from the temperature sensor circuit 11 by connection of the resistor 24 having a predetermined resistance value to the temperature sensor circuit 11 when the temperature sensor circuit 11 operates normally. The reference value is determined by a voltage value of the power source 12 and resistance values of the resistors 13, 14, and 15.

At Step S45, the microcomputer 17 determines, on the basis of the result of comparison made at Step S44, whether the value of the diagnostics signal 18*b* falls within the predetermined detection range 35 about the reference value shown in FIG. 2. If it is determined that the value falls with the detection range 35, the temperature sensor circuit 11 is detected to be operational and the microcomputer 17 outputs at Step S46 information indicating that the temperature sensor circuit 11 is operational to the host control apparatus. If it is determined at Step S45 that the detection range 35 is exceeded, the temperature sensor circuit 11 is detected to be faulty and the microcomputer 17 outputs at Step S47 information indicating that the temperature sensor circuit 11 is faulty to the host control apparatus.

After the response to the host control apparatus at Step S46 or Step S47, the microcomputer 17 performs Step S48 and turns OFF the changeover signal 19. This results in the temperature sensor 10 being connected with the temperature sensor circuit 11. The microcomputer 17 thereafter returns to Step S40 and monitors temperatures of the temperature sensor 10.

As described above, in accordance with the present embodiment, the resistors 13 and 14 of the temperature sensor circuit 11 can be appropriately detected for a fault with high accuracy.

The embodiment described above can achieve the following effects.

(1) The fault detection apparatus 1 includes the temperature sensor circuit 11, the resistor 24, the first circuitry 20 and the second circuitry 22, and the microcomputer 17. Specifically, the temperature sensor circuit 11 is connected with the temperature sensor 10 and generates the characteristic signal 18a of the temperature sensor 10. The resistor 24 outputs a predetermined signal value. The first circuitry 20 and the second circuitry 22 connect the resistor 24, instead of the temperature sensor 10, with the temperature sensor circuit 11. The microcomputer 17 detects a fault in the temperature sensor circuit 11 using a diagnostics signal output from the temperature sensor circuit 11 on the basis of the predetermined signal value when the resistor 24 is connected. The foregoing arrangements can enhance fault detection accuracy of the temperature sensor circuit 11.

(2) The first circuitry 20 and the second circuitry 22 connect the temperature sensor 10 or the resistor 24 with the temperature sensor circuit 11 in accordance with the changeover signal output from the microcomputer 17. This enables an appropriate changeover based on the changeover signal output from the microcomputer 17 during the fault diagnostics procedure.

(3) The first circuitry 20 disables the temperature sensor 10. The second circuitry 22 changes a connection destination of the temperature sensor circuit 11 to the resistor 24 under a condition in which the first circuitry 20 disables the temperature sensor 10. This enables detection of a fault of the temperature sensor circuit 11 without being affected by the temperature sensor 10.

(4) The microcomputer 17 detects a fault in the temperature sensor circuit 11 by determining whether the diagnostics signal 18b falls within a predetermined range. This approach can enhance detection accuracy of a fault in the temperature sensor circuit 11.

Modifications

The present invention can be carried out by modifying the above-described embodiment as follows:

(1) The embodiment has been described for an exemplary configuration including the temperature sensor 10 and the temperature sensor circuit 11. The invention can still be similarly carried out using, instead of the temperature sensor 10, a voltage output sensor or any other type of sensor.

(2) The above embodiment has been described for an exemplary case in which the second circuitry 22 includes the resistor 24 having a predetermined resistance value and the fault diagnostics procedure for the temperature sensor circuit 11 is performed on the basis of the voltage output from the resistor 24. In place of the resistor 24, a constant-voltage source that outputs a predetermined voltage, for example, may nonetheless be provided. A possible required configuration is such that a signal output part that outputs a predetermined signal value outputs the predetermined signal value when connected with the temperature sensor circuit 11 and, using the output, the temperature sensor circuit 11 outputs a predetermined diagnostics signal 18b.

(3) The above embodiment has been described for an exemplary case in which the fault diagnostics procedure for the temperature sensor circuit 11 is performed in accordance with an instruct on from the host control apparatus. The fault diagnostics procedure may nonetheless be performed upon any other condition. The fault diagnostics procedure for the temperature sensor circuit 11 is performed when, for example, the temperature detected by the temperature sensor 10 indicates an abnormal value. If, as a result, a fault in the temperature sensor circuit 11 is detected, the temperature sensor circuit 11 is determined to be faulty; and if a fault in the temperature sensor circuit 11 is not detected, then the temperature sensor 10 is determined to be faulty. This approach allows which one of the temperature sensor 10 or the temperature sensor circuit 11 to be determined to be faulty when a measured temperature is abnormal.

It will be understood that the embodiment described above is not intended to limit the present invention and various other embodiments contemplated within the spirit and scope of the present invention are included in the scope of the present invention as long as the features of the present invention are not impaired. Additionally, a configuration may even combine the above embodiment with a plurality of modifications.

REFERENCE SIGNS LIST 1 fault detection apparatus
10 temperature sensor
11 temperature sensor circuit
12 power source
16 capacitor
17 microcomputer
20 first circuitry
22 second circuitry
24 resistor

The invention claimed is:

1. A fault detection apparatus, comprising:
a sensor circuit part connected with a sensor part, the sensor circuit part configured to generate a characteristic signal of the sensor part;
a signal output part configured to output a predetermined signal value;
a changeover circuit part that connects the signal output part in place of the sensor part with the sensor circuit part; and
a control part configured to detect a fault in the sensor circuit part using a diagnostics signal that is output from the sensor circuit part on a basis of the predetermined signal value when the signal output part is connected, wherein
the changeover circuit part includes a first circuit part configured to disable the sensor part by short-circuiting both ends of the sensor part, and
a second circuit part configured to change a connection destination of the sensor circuit part to the signal output part when the first circuit part disables the sensor part.

2. The fault detection apparatus according to claim 1, wherein the changeover circuit part connects the sensor part or the signal output part with the sensor circuit part using a changeover signal output from the control part.

3. The fault detection apparatus according to claim 1, wherein the control part is configured to detect a fault in the sensor circuit part by determining whether the diagnostics signal falls within a predetermined range.

4. The fault detection apparatus according to claim 1, wherein the sensor part comprises a temperature sensor.

5. The fault detection apparatus according to claim 1, wherein the signal output part comprises a resistor having a predetermined resistance value.

* * * * *